(12) United States Patent
Kudo

(10) Patent No.: US 7,549,810 B2
(45) Date of Patent: *Jun. 23, 2009

(54) LIGHT AMOUNT ADJUSTING APPARATUS AND IMAGE PICKUP APPARATUS

(75) Inventor: Tomoyuki Kudo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/045,948

(22) Filed: Mar. 11, 2008

(65) Prior Publication Data

US 2008/0152338 A1 Jun. 26, 2008

Related U.S. Application Data

(62) Division of application No. 11/178,539, filed on Jul. 11, 2005, now Pat. No. 7,374,352.

(30) Foreign Application Priority Data

Jul. 29, 2004 (JP) .............................. 2004-221091
Jun. 27, 2005 (JP) .............................. 2005-186011

(51) Int. Cl.
G03B 9/00 (2006.01)
G03B 9/10 (2006.01)

(52) U.S. Cl. ...................................... 396/458; 396/493

(58) Field of Classification Search ................. 396/449, 396/458, 485–488, 493, 505, 507
See application file for complete search history.

(56) References Cited

U.S. PATENT DOCUMENTS

| 4,346,977 | A | * | 8/1982 | Ooba | .......................... 396/488 |
| 4,825,236 | A | * | 4/1989 | Hashimoto et al. | .......... 396/487 |
| 7,374,352 | B2 | * | 5/2008 | Kudo | .......................... 396/458 |

* cited by examiner

*Primary Examiner*—Rodney E Fuller
(74) *Attorney, Agent, or Firm*—Cowan, Liebowitz & Latman, P.C.

(57) ABSTRACT

A light amount adjusting apparatus for an image pickup which is capable of reducing the force with which a plate member and a blade member are held in close contact with each other and driving the blade member smoothly even in a high-humidity condition. The apparatus includes a base plate 5 having an opening 5a, a blade member 1 movable within a range including a position where the blade member overlaps the opening 5a in a light axis direction and restricting the amount of light passing through the opening 5a by overlapping the opening 5a, and a plate member 2 adjacent to the blade member 1 and having a cut portion 2a at a position where the plate member overlaps the blade member 1 in the light axis direction in a state in which the blade member 1 is at a predetermined position.

12 Claims, 11 Drawing Sheets

LIGHT AMOUNT ADJUSTING APPARATUS AND IMAGE PICKUP APPARATUS

CROSS-REFERENCE TO RELATED APPLICATIONS

This application is a divisional of application Ser. No.11/178,539, filed Jul. 11, 2005, now U.S. Pat. No.7,374,352, the entire disclosure of which is hereby incorporated by reference.

BACKGROUND OF THE INVENTION

1. Field of the Invention

The present invention relates to a light amount adjusting apparatus provided in a digital camera or the like and to an image pickup apparatus equipped with the same.

2. Related Background Art

Recently, digital cameras capable of taking images in memory without using films have sprung into wide use. Among such digital cameras is one endowed with a function by which it puts the diaphragm blades in and out of a light beam according to the object illuminance, thereby varying the amount of light reaching the image pickup device. In this process, it is general practice to drive the diaphragm blades by a dedicated electromagnetic actuator to perform light amount adjustment. Further, there exists a device often used in a digital camera, a video camera or the like with a built-in CCD. This device adopts an exposure structure in which an ND filter adapted to reduce the amount of light passing therethrough is bonded to a part of the diaphragm blades and in which, when the size of the diaphragm aperture formed by the diaphragm blades becomes smaller than a certain size, the ND filter is inserted into the diaphragm aperture.

The diaphragm blades each are generally formed as a shutter unit; in a typical example of the construction of such a shutter unit, a shutter blade is incorporated into a base plate, and a partition plate is placed thereon; further, a diaphragm blade is placed thereon before covering the whole with a shutter cover. An actuator for driving the shutter blade and the diaphragm blade is arranged on the opposite side in the light axis direction of the shutter blade and the diaphragm blades with respect to the base plate.

When such a photographing apparatus, e.g., a digital camera, is used in a hostile environment, such as one with high humidity, dew condensation may occur within the camera, which leads to a problem in terms of internal function. In view of this, various countermeasures have been taken; for example, a ventilation hole for letting air into and out of the camera body is provided to thereby restrain an increase in internal humidity, or, as disclosed in Japanese Patent Application Laid-Open No. 2000-171874, there is provided dew condensation detection means for detecting dew condensation within the camera body.

However, the method in which a ventilation hole for preventing dew condensation is provided has a problem in that, as a result of the general reduction in camera size, there are limitations regarding the space for providing the ventilation hole, and there is little possibility of effectively arranging the ventilation hole. Further, with the tough competition in cost, there is a demand for a reduction in cost; under the circumstances, it is rather difficult to arrange such a dew condensation detection sensor, and it is also becoming increasingly difficult to secure the space for the sensor.

Further, in the case in which the shutter unit as mentioned above is formed, when dew condensation occurs and the diaphragm blades and the partition plate are brought into close contact with each other, the drive load of the diaphragm blades increases, so that it is necessary to increase the drive force by, for example, enlarging the actuator. However, due to the limitation in terms of space as a result of the general reduction in camera size, it would be impossible to realize a construction in which the actuator for the diaphragm blades is enlarged in order to operate them with a drive force larger than the force with which the diaphragm blades and the partition plate are held in close contact with each other.

Apart from this, there is a method according to which hemispherical projections are provided on the diaphragm blades at positions where the diaphragm blades and the partition plate come into contact with each other with a view to preventing the diaphragm blades and the partition plate as much as possible from close contact with each other. FIGS. 15A and 15B show a diaphragm blade 1' provided with hemispherical projections. FIG. 15A is a front view of the diaphragm blade 1', and FIG. 15B is a rear view of the diaphragm blade 1'. The diaphragm blade 1' is equipped with an opening 1a', an ND filter 9 covering the same, and hemispherical projections 1b' provided on one side of the diaphragm blade 1. Due to the hemispherical projections 1b', the contact area between the diaphragm blade 1' and the partition plate 2 is reduced, so that even in a high humidity condition, the force with which the partition plate 2 and the diaphragm blade 1' are held in close contact with each other can be reduced, and the diaphragm blade 1' can be operated smoothly. However, in this case also, the diaphragm blade may bend or fall, making it difficult to completely eliminate close contact between the diaphragm blade and the partition plate. Further, as the reduction in size advances, there is a demand for elimination of even the space corresponding to these projections.

SUMMARY OF THE INVENTION

It is an object of the present invention to provide a light amount adjusting apparatus for an image pickup apparatus which is capable of reducing the force with which the plate member and the blade member are held in close contact with each other to thereby allow smooth driving of the blade member, and an image pickup apparatus equipped with the same.

In order to achieve the above object, as one of features of the present invention, there is employed a light amount adjusting apparatus used in an image pickup apparatus, characterized in that the light amount adjusting apparatus includes: a base plate having an opening; a blade member movable within a range including a position where the blade member overlaps the opening in a light axis direction, for restricting the amount of light passing through the opening by overlapping the opening; and a plate member adjacent to the blade member and having a cut portion at a position where the plate member overlaps the blade member in the light axis direction in a state in which the blade member is at a predetermined position.

Another feature of the present invention relates to an image pickup apparatus equipped with a light amount adjusting apparatus as described above and adapted to control the amount of light reaching the image pickup means by the light amount adjusting apparatus.

BRIEF DESCRIPTION OF THE DRAWINGS

FIG. 7 is a perspective view of a digital camera according to an embodiment of the present invention with the power on;

FIG. 9 is a top view of a digital camera according to an embodiment of the present invention with the power on;

DESCRIPTION OF THE PREFERRED EMBODIMENTS

Figure 7:
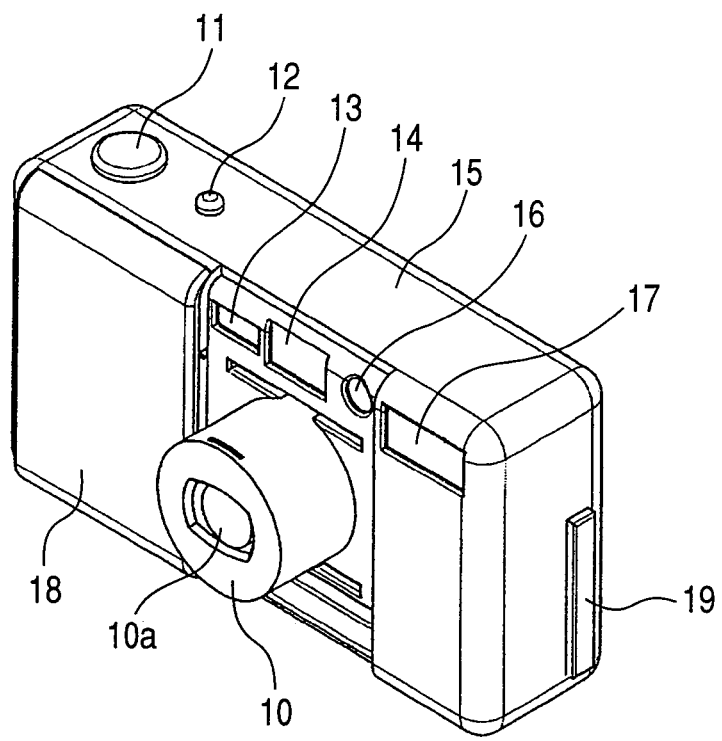
Figure 8:
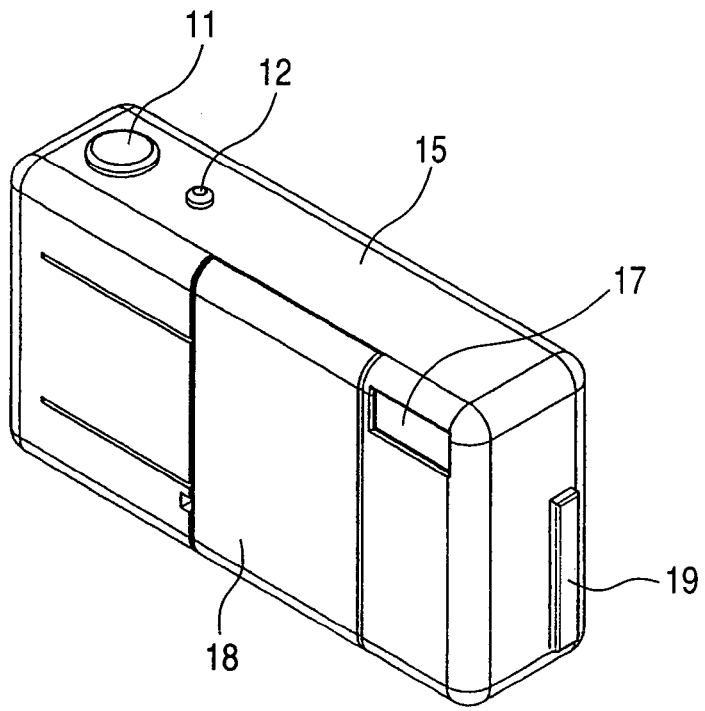
FIG. 8 is a perspective view of a digital camera according to an embodiment of the present invention with the power off.
Figure 9:
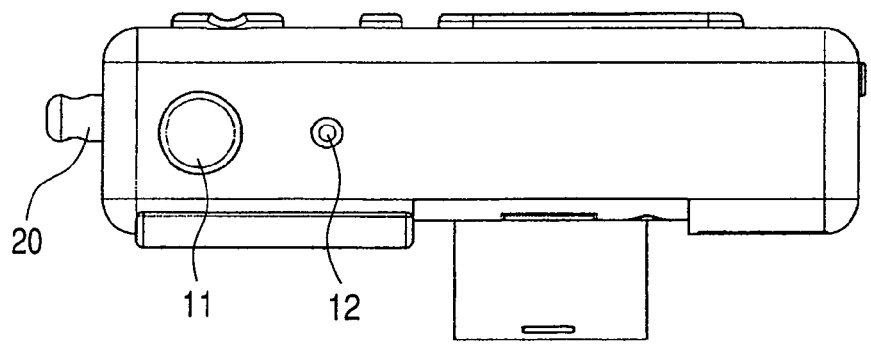
Figure 10:
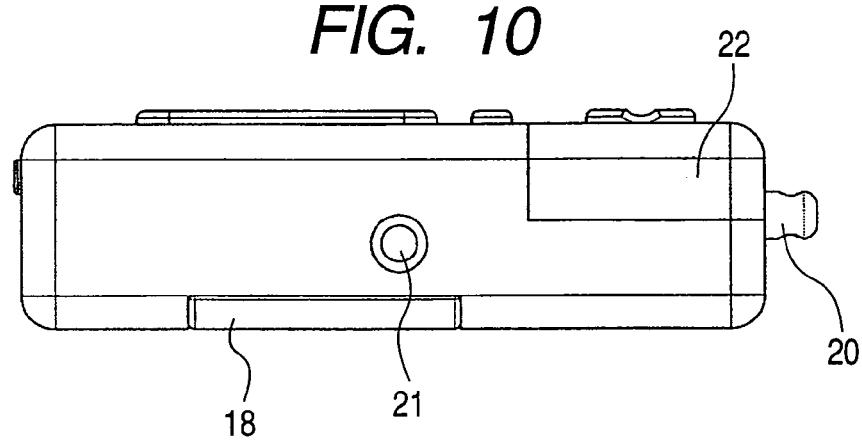
FIG. 10 is a bottom view of a digital camera according to an embodiment of the present invention with the power off.
Figure 11:
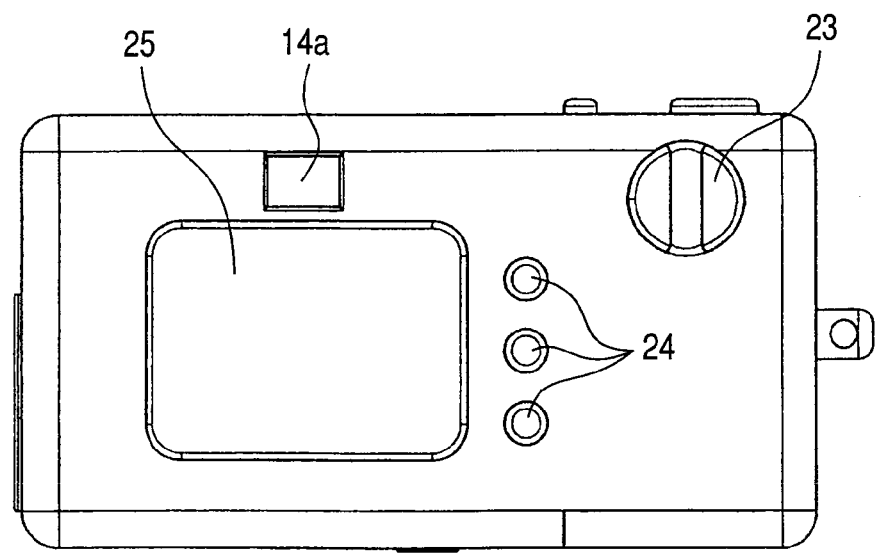
FIG. 11 is a rear view of a digital camera according to an embodiment of the present invention.

FIGS. 7 through 11 are diagrams showing a digital camera constituting a photographing apparatus equipped with a light amount adjusting apparatus according to an embodiment of the present invention. More specifically, FIG. 7 is an outward perspective view of the digital camera with its sliding lens cover open with respect to the camera main body, FIG. 8 is an outward perspective view of the digital camera with its sliding lens cover closed with respect to the camera main body, FIG. 9 is a top view of the digital camera with its sliding lens cover open with respect to the camera main body, FIG. 10 is a bottom view of the digital camera with its sliding lens cover closed with respect to the camera main body, and FIG. 11 is a rear view of the digital camera.

As shown in FIG. 8, the digital camera of this embodiment, indicated at 15, is a slide cover type; when the digital camera is not in use, the front surface of a photographing lens barrel 10 is covered with a sliding lens cover 18; as shown in FIG. 7, when the digital camera is to be used, the sliding lens cover 18 is caused to slide sidewise to thereby expose the photographing lens barrel 10.

On the front surface of the digital camera 15, there are provided a finder 14 for determining the composition of the picture of the object, a photometry/ranging portion 13 for performing photometry and ranging, a red-eye lamp 16, a strobe portion 17, and a photographing lens barrel 10 equipped with a first lens group 10a (see FIG. 7). On the top surface, there are provided a release button 11, and a strobe flashing mode button 12 (see FIGS. 7 and 8). On side surfaces, there are provided an external input/output terminal mounting portion 19, and a strap retaining portion 20 (see FIGS. 9, 10, etc.). On the bottom surface, there are provided a tripod mounting portion 21, and a card battery cover 22 covering a memory card drive described below and a battery inserting portion (see FIG. 10). On the rear surface, there are provided operating buttons 24, a display 25 consisting of an LCD, a zoom button 23, and a finder eyepiece portion 14a (see FIG. 11).

By the operating buttons 24, the selection of the operation mode for the digital camera is made from among, for example, a photographing mode, a reproduction mode, and a moving picture taking mode. The display 25 displays on the screen image data stored in memory 34 (see FIG. 12) or image data read from the memory card drive, and is also capable of displaying on the screen a plurality of items of photographic data in a reduced form.

Figure 12:
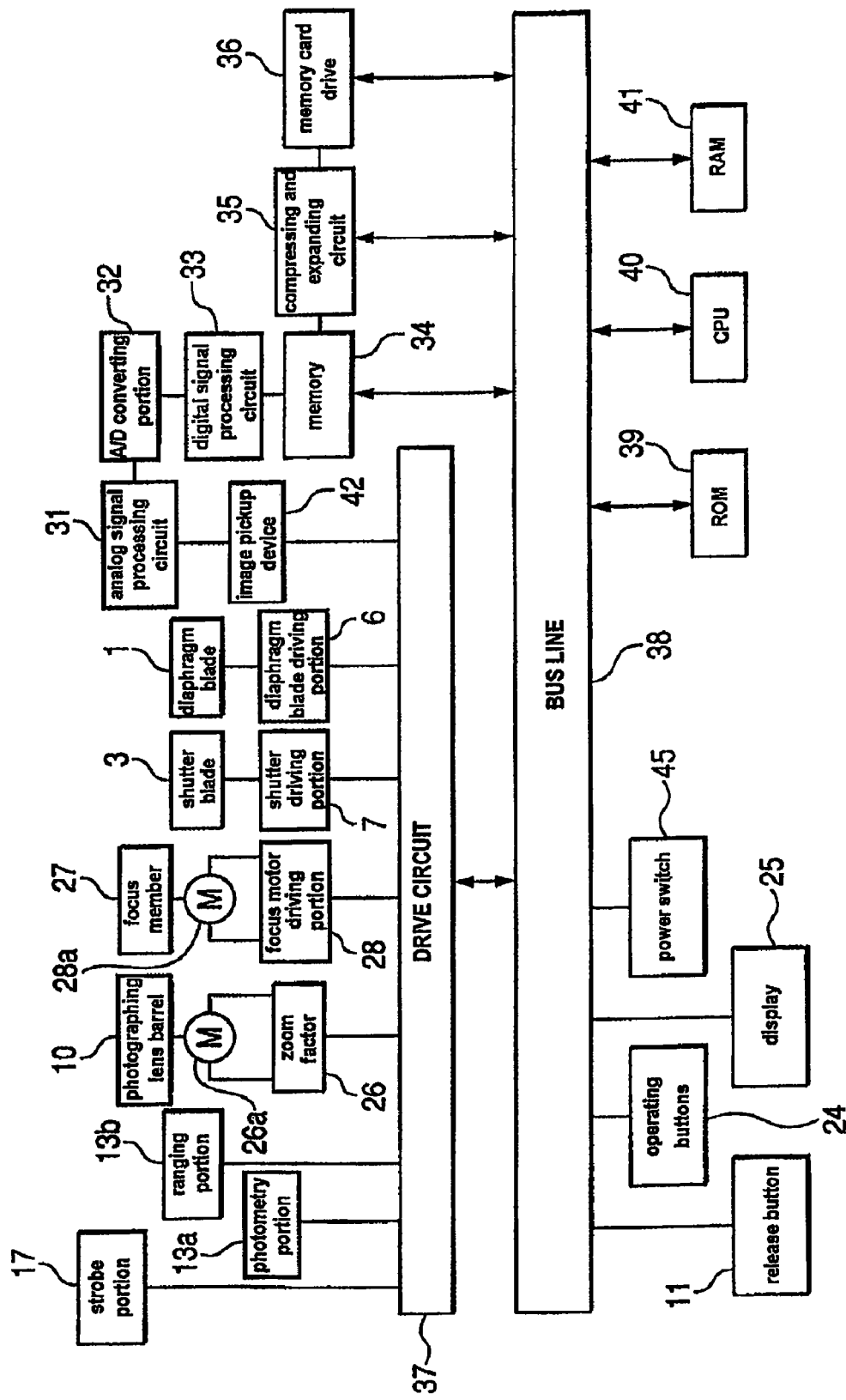
FIG. 12 is a block diagram showing the circuit configuration of a digital camera according to an embodiment of the present invention.

FIG. 12 is a block diagram showing the circuit configuration of the digital camera 15; the portions that are the same as those of FIGS. 7 through 11 are indicated by the same reference symbols.

A controlling portion is composed of a CPU 40, a ROM 39, and a RAM 41. Connected to this controlling portion through a bus line 38 are the release button 11, the operating buttons 24, the display 25, a power switch 45 turned on/off in synchronism with the operation of the sliding lens cover 18, the memory 34, a compressing and expanding circuit 35, and a memory card drive 36. Connected to a drive circuit 37 connected to the controlling portion through the bus line 38 are a zoom motor driving portion 26 for driving a zoom motor 26a, a focus motor driving portion 28 for driving a focus motor 28a, a shutter driving portion 7, and a diaphragm driving portion 6. According to a signal from the controlling portion, the drive circuit 37 drives the photographing lens barrel 10, a focusing member 27, a shutter blade 3, and a diaphragm blade 1. Further, also connected to the drive circuit 37 are a photometry portion 13a, a ranging portion 13b, an image pickup device 42 with a photoelectric transducer such as a CCD or CMOS, and the strobe portion 17, and the drive circuit 37 controls the driving of each component according to a signal from the controlling portion. Connected to the output side of the image pickup device 42 are an analog signal processing circuit 31, an A/D converting portion 32, and a digital signal processing circuit 33 outputting a digital signal to the memory 34. The ROM 39 stores programs for controlling the above-mentioned functional components, and the RAM 41 stores the requisite data for each control program.

In the digital camera 15, constructed as described above, when the user slides the sliding lens cover 18 from the position as shown in FIG. 8 to the position as shown in FIG. 7, the power switch 45, which has been off, is turned on in synchronism therewith, and power is supplied to each circuit. Then, the CPU 40 reads the requisite control program from the ROM 39 to start initial operation. That is, the photographing lens barrel 10 is moved to a predetermined region allowing photographing (the state as shown in FIG. 7), thus making the camera ready for photographing.

When the user depresses the release button 11 to perform photographing, the brightness of the object is detected by the photometry portion 13a, and based on the photometry value, the aperture and the shutter speed are determined, and a judgment is made as to whether the strobe portion 17 is to be caused to flash or not. Further, using the operating buttons 24, the user may previously make selection between forcible flashing and non-flashing of the strobe portion 17. Further, simultaneously, ranging is performed by the ranging portion 13b, and the distance to the object is measured to compute focal information, and based on the focal information, the focusing member 27 is moved to a predetermined focus position through the drive circuit 37 and the focus motor driving portion 28. Next, the opening/closing of the shutter blade 3 is effected through the drive circuit 37 and the shutter driving portion 7, and a desired image is picked up by the image pickup device 42.

Accumulated in the image pickup device 42 is a charge corresponding to the amount of light allowed to enter based on an exposure control value. The charge is turned into an image signal, which is outputted to the analog signal processing circuit 31. The analog signal processing circuit 31 performs analog processing on the image data picked up before outputting the image data to the A/D converting portion 32. The A/D converting portion 32 converts the analog data taken in to digital data, and outputs the digital data to the digital signal processing circuit 33. The digital signal processing circuit 33 performs processing on the digital data, which is stored in the memory 34.

The digital data (image data) stored in the memory 34 is subjected to a compression processing, such as JPEG or TIFF, by the compressing and expanding circuit 35 through manipulation of the operating buttons 24, and is stored in the memory card drive 36 on the output side of the circuit. Note that, in the case of a digital camera without the memory 34, the image data processed in the digital signal processing circuit 33 is outputted to the compressing and expanding circuit 35 before being stored in the memory card drive 36.

Further, by outputting the image data stored in the memory 34 or the image data stored in the memory card drive 36 to the compressing and expanding circuit 35, expansion processing is effected by the compressing and expanding circuit 35, and the image data is outputted to the display 25 through the bus line 38 to display the image. When, upon seeing the image on the display 25, it is determined that the image is unnecessary, the user can delete the image data through manipulation of the operating buttons 24.

As shown in FIG. 11, the zoom button 23 is arranged on the rear surface of the digital camera 15; when the zoom button 23 is manipulated, the zoom motor driving portion 26 and the zoom motor 26a are controlled through the drive circuit 37, and the photographing lens barrel 10 moves in the light axis direction of the lens. Further, it is also possible to effect so-called digital zoom, enlarging or reducing the stored image displayed on the display 25 through manipulation of the zoom button 23.

Here, a light amount adjusting apparatus provided in the digital camera 15 and including a shutter blade 3 or a diaphragm blade 1 for adjusting the amount of light reaching the image pickup device 42, will be described with reference to FIGS. 1 through 4.

As shown in FIGS. 1 through 4, the shutter blade 3, a partition plate 2, and a diaphragm blade 1 are incorporated into a base plate 5, and are finally retained by a shutter cover 4. On the back side of the base plate 5, there are retained a diaphragm blade driving portion 6 for driving the diaphragm blade 1 and a shutter blade driving portion 7 for driving the shutter blade 3.

Provided near the center of the base plate 5 is an opening 5a through which light is to be passed, and the shutter blade 3 is incorporated in the front side of the opening 5a. The shutter blade 3 can be operated in a recessed space portion 5b formed in the base plate 5, and the partition plate 2 is incorporated in the front side of the shutter blade 3. The partition plate 2 is installed on a flat surface portion 5c of the base plate 5. Substantially at the center of the partition plate 2, there is formed a plate opening 2b determining the optical aperture of the digital camera 15. The partition plate opening 2b has an area smaller than that of the base plate opening 5a. The diaphragm blade 1 is incorporated in the front side of the partition plate 2, and the whole is retained by the shutter cover 4 so as not to be detached from the base plate 5. Formed in the diaphragm blade 1 is a diaphragm opening 1a which is smaller than the partition plate opening 2b.

The shutter blade 3 opens and closes the partition plate opening 2b by the shutter blade driving portion 7. The diaphragm blade 1 is caused to advance and retreat with respect to the partition plate opening 2b (enter the partition plate opening 2b and retract therefrom) by the diaphragm blade driving portion 6. The partition plate 2 has a cut portion 2a, and is installed on the flat surface portion 5c of the base plate 5. Except for the cut portion 2a and the partition plate opening 2b, the surfaces of the diaphragm blade 1 and the partition plate 2 opposed to each other are formed by flat surfaces, and have no projections for reducing the friction between the opposing surfaces, unlike in the states as shown in the FIGS. 15A and 15B, so that they can be reduced in thickness.

Figure 1:
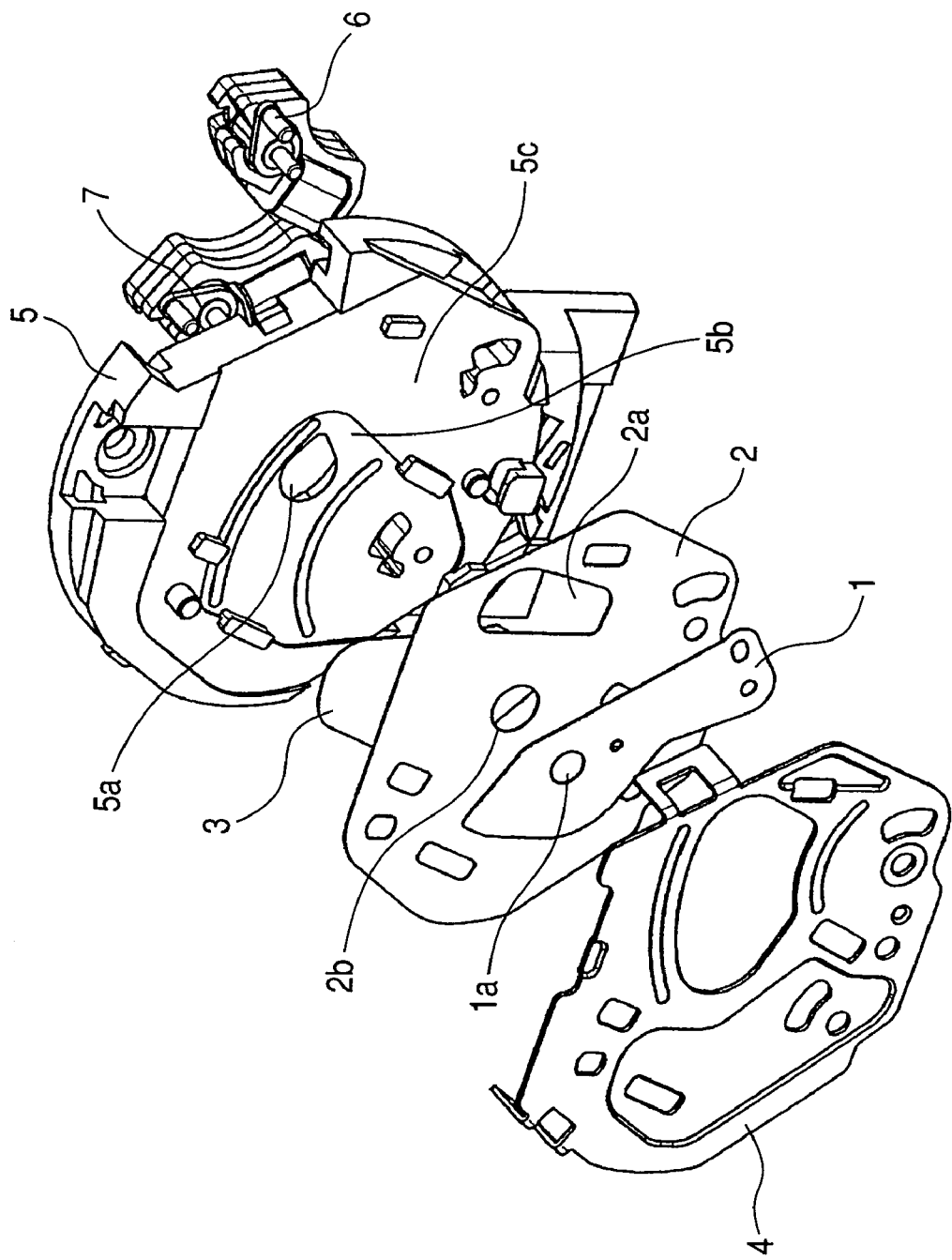
FIG. 1 is an exploded perspective view of a light amount adjusting apparatus according to an embodiment of the present invention.
Figure 2:
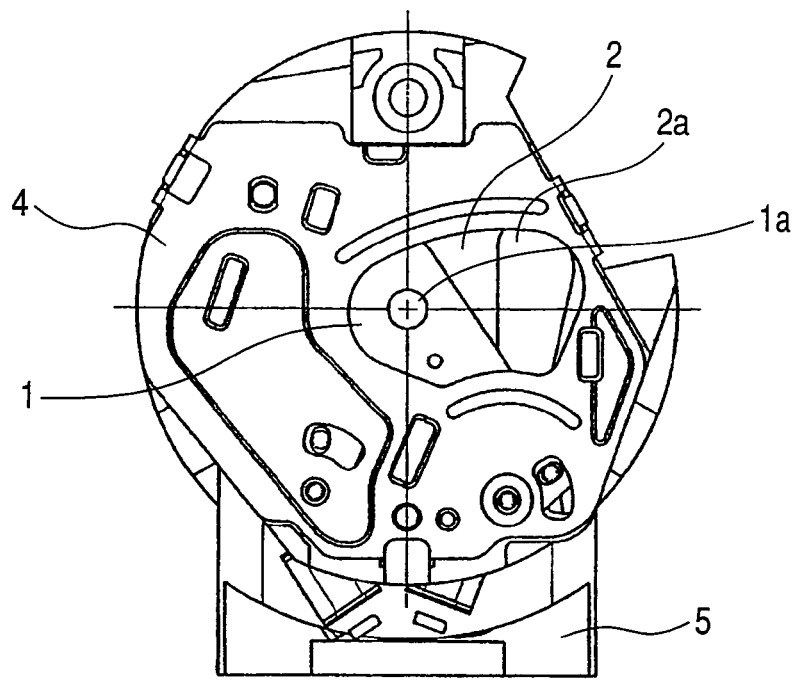
FIG. 2 is a front view of the light amount adjusting apparatus of FIG. 1 with the diaphragm blades inserted in the optical path.
Figure 3:
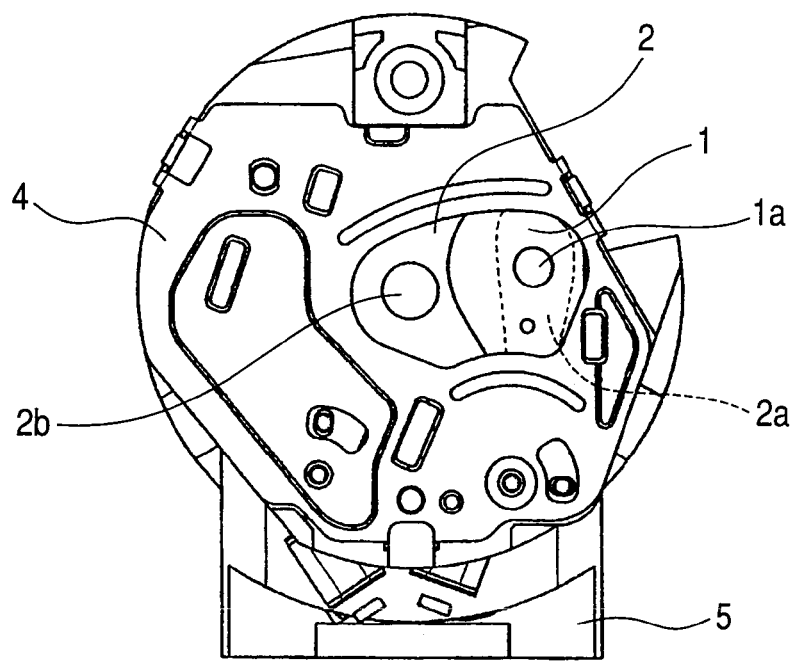
FIG. 3 is a front view of the light amount adjusting apparatus of FIG. 1 with the diaphragm blades retracted from the optical path.
Figure 4:
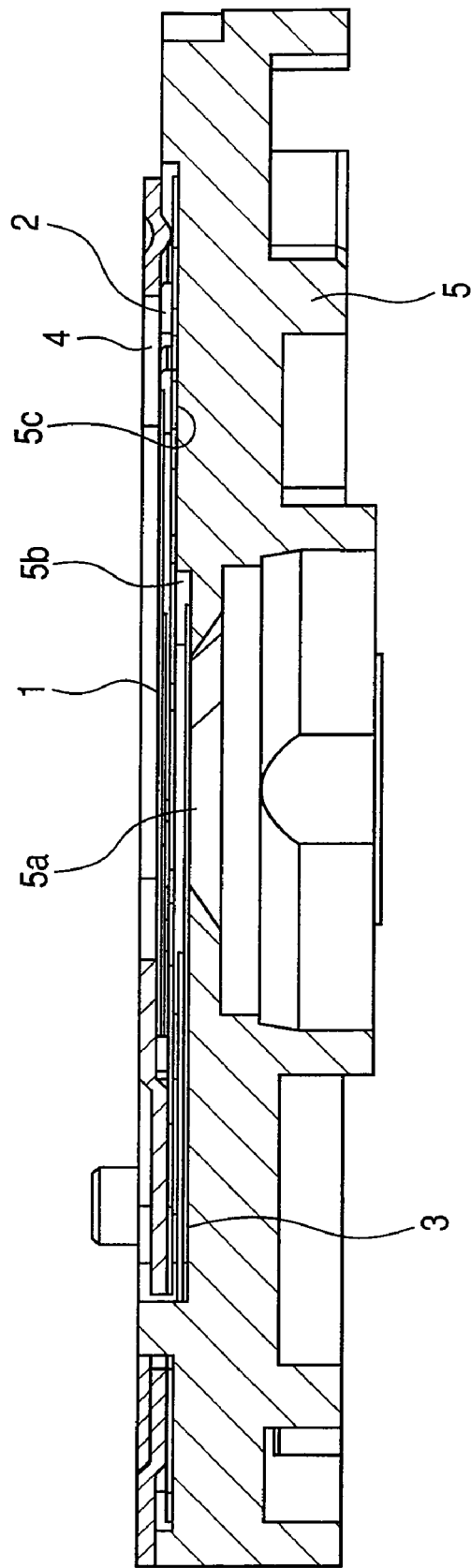
FIG. 4 is a sectional view of the light amount adjusting apparatus of FIG. 1.

FIGS. 2 and 3 are front views of the light amount adjusting apparatus.

FIG. 2 shows a state in which the diaphragm blade 1 has moved to a position on the diaphragm blade opening 2b, with the diaphragm opening 1a being on the diaphragm plate opening 2b and the base plate opening 5a. In this state, the cut portion 2a provided in the partition plate 2 is visible from the front side, and the diaphragm opening 1a of the diaphragm blade 1 does not overlap the cut portion 2a but overlaps the partition plate opening 2b. In the state shown in FIG. 3, the diaphragm blade 1 is retracted from the partition plate opening 2b. In this state, the cut portion 2a provided in the partition plate 2 and the diaphragm blade 1 overlap each other; the diaphragm opening 1a of the diaphragm blade 1 does not overlap the partition plate opening 2b but overlaps the cut portion 2a.

Figure 15A:
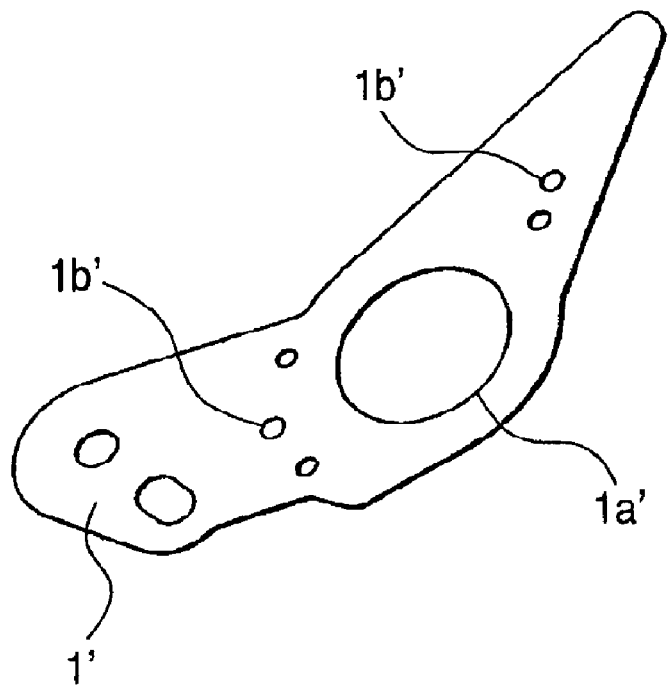
FIG. 15A is a front view of a diaphragm blade provided with hemispherical projections for reducing the contact area between the partition plate and the diaphragm blade.
Figure 15B:
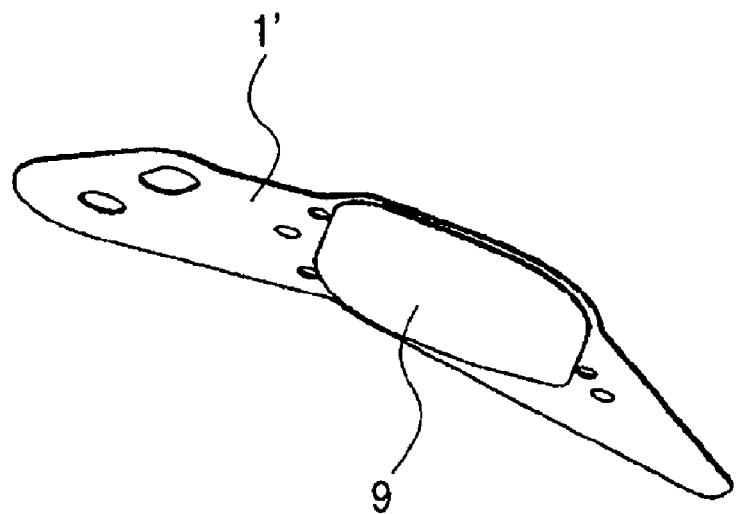
FIG. 15B is a rear view of a diaphragm blade provided with hemispherical projections for reducing the contact area between the partition plate and the diaphragm blade.

In this construction, when, in the state in which the diaphragm blade 1 is retracted from the partition opening 2b and the base plate opening 5a as shown in FIG. 3, the whole is placed, for example, in a high-humidity environment, there is the possibility of dew condensation occurring between the diaphragm blade 1 and the partition plate 2. However, since the cut portion 2a is provided in the partition plate 2, it is possible to reduce the contact area between the partition plate 2 and the diaphragm blade 1, making it possible to reduce their respective contact forces due to dew condensation. Thus, even in an unfavorable environment liable to involve dew condensation, it is possible to drive the diaphragm blade 1 smoothly. Further, unlike the conventional example in which there are provided projections for reducing the friction between the diaphragm blade and the partition plate as shown in FIGS. 15A and 15A, this embodiment adopts a construction in which the diaphragm blade 1 is supported in face by the partition plate 2, so that there is no fear of the diaphragm blade 1 being bent. Further, since there are no projections, the thickness as occupied by the partition plate 2 is so much the smaller, making it possible to reduce the thickness of the light amount adjusting apparatus as a whole.

It should be noted that the cut portion 2a is provided solely for the purpose of reducing the contact area between the partition plate 2 and the diaphragm blade 1; the cut portion 2a is not intended for passage or insertion of any member in order to connect members arranged on either side of the partition plate 2. Further, as compared with the state as shown in FIG. 2, in which the diaphragm blade 1 overlaps a part of the cut portion 2a, the overlapping area between the cut portion 2a and the diaphragm blade 1 is larger in the state as shown in FIG. 3.

When the power of the digital camera 15 is off, that is, when no drive signal is supplied to the light amount adjusting apparatus, the diaphragm blade 1 is at the position as shown in FIG. 3. It is to be assumed that the digital camera 15 is most often left alone with the power off. Therefore, the overlapping area of the cut portion 2a and the diaphragm blade 1 is made the largest, thereby preventing the diaphragm blade 1 and the partition plate 2 from being fixed to each other.

Figure 5:
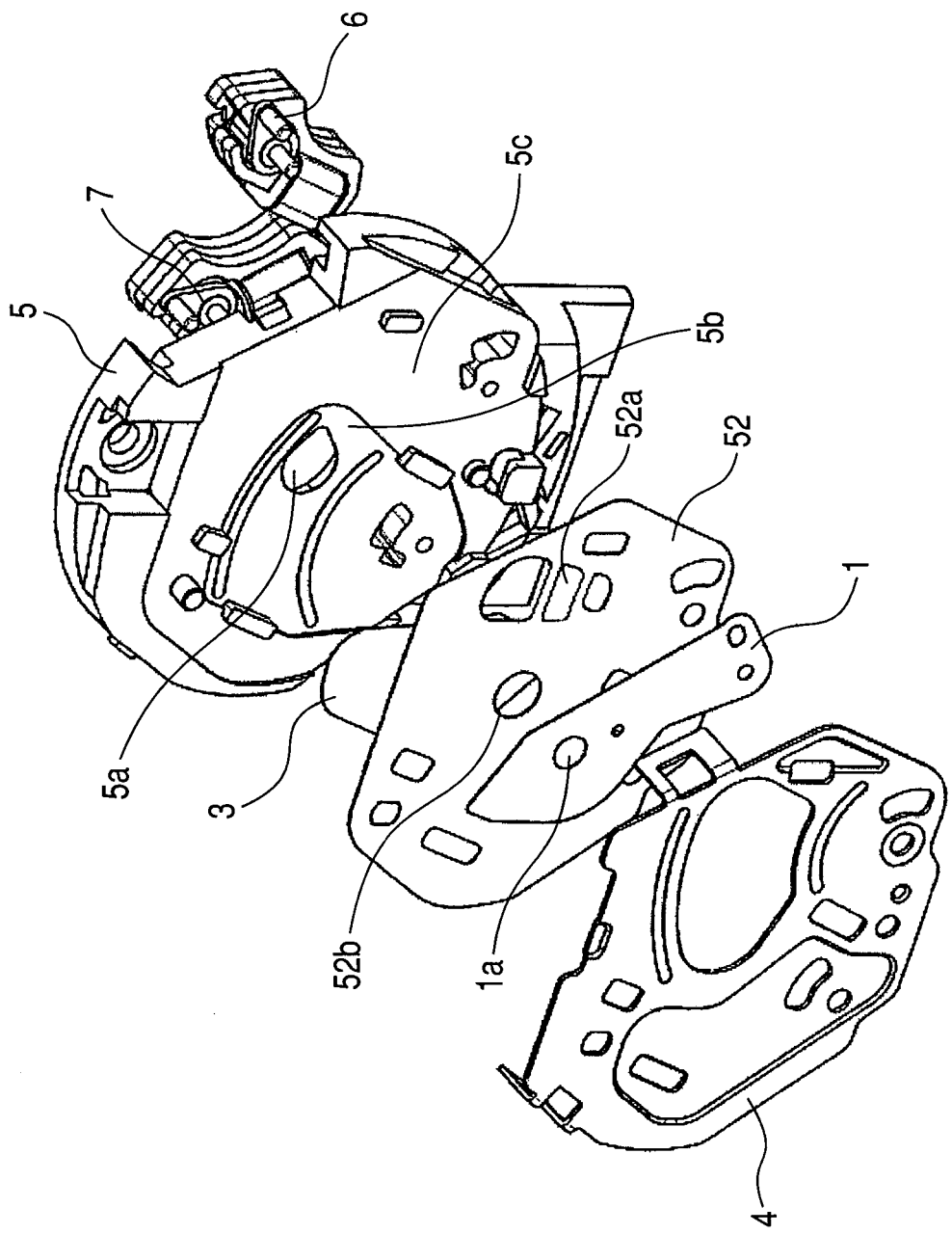
FIG. 5 is an exploded perspective view of a modification of a light amount adjusting apparatus according to an embodiment of the present invention.
Figure 6:
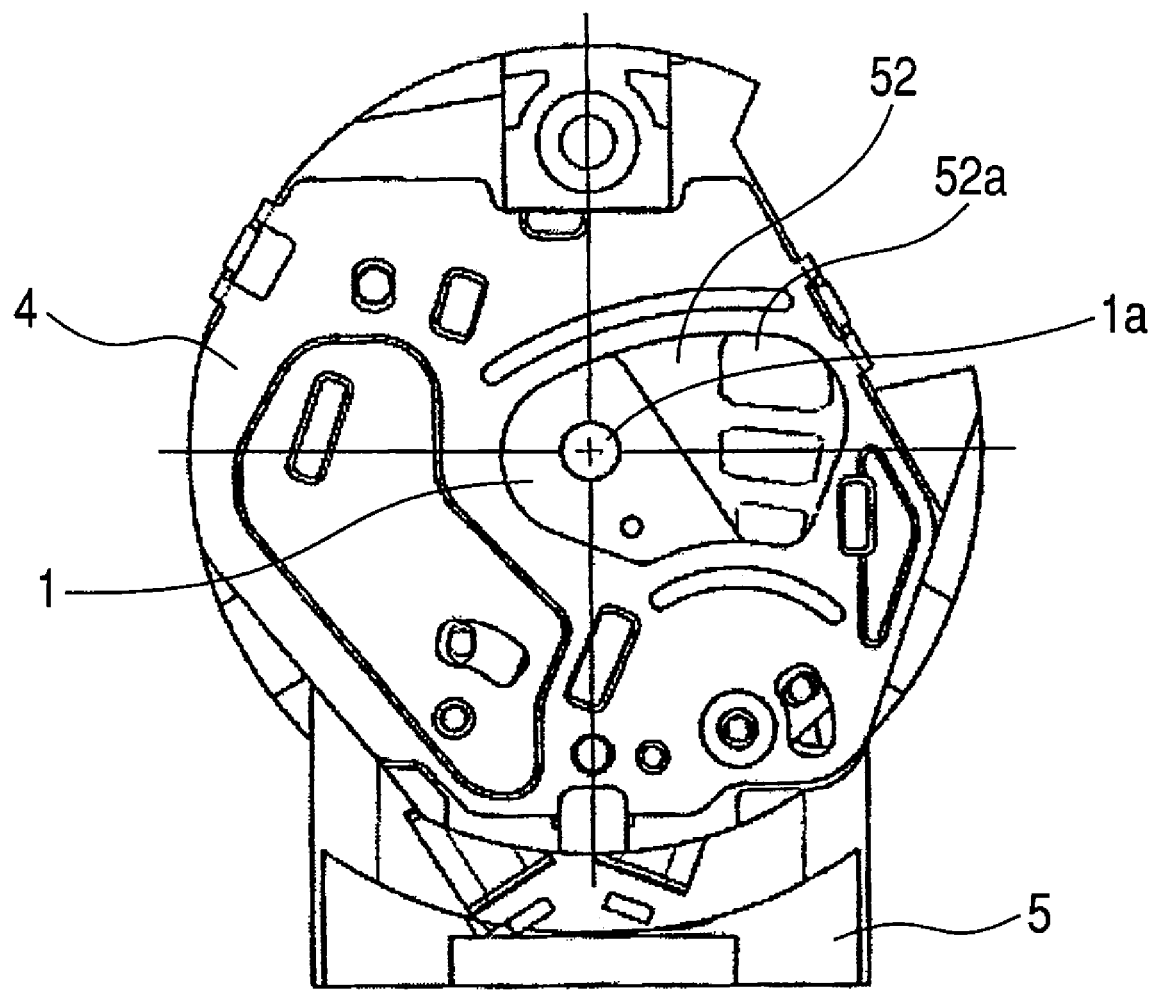
FIG. 6 is a front view of the light amount adjusting apparatus of FIG. 5 with the diaphragm blades inserted in the optical path.

FIGS. 5 and 6 show a modification of this light amount adjusting apparatus. This light amount adjusting apparatus only differs from the one shown in FIGS. 1 through 4 in that it is equipped with a partition plate 52 instead of the partition plate 2. The partition plate 52 has a plurality of cut portions 52a; in the state in which the diaphragm opening 1a of the diaphragm blade 1 is on the base plate opening 5a, the diaphragm blade 1 is situated on none of the cut portions 52a. In this way, the configuration and size of the cut portions formed in the partition plate are not restricted to those of FIGS. 1 through 4, nor are they of course restricted to those of FIGS. 5 and 6. As long as the object of the present invention is achieved, there are no limitations regarding the configuration and size of the cut portions formed in the partition plate.

Figure 13:
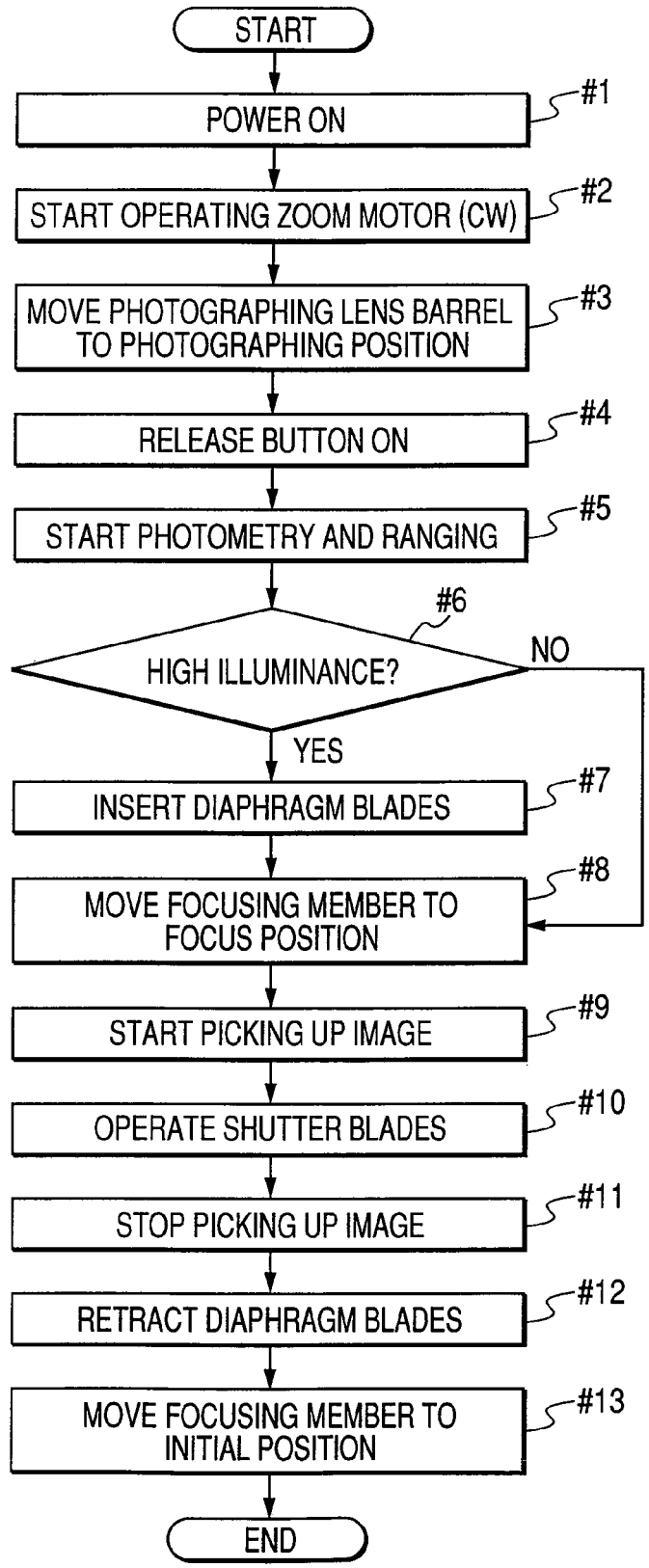
FIG. 13 is a flowchart illustrating the operation at the time of photographing of a digital camera according to an embodiment of the present invention.

Next, a series of operations from turning on the power of the digital camera 15 equipped with the light amount adjusting apparatus described above to the completion of photographing, will be described with reference to the flowchart of FIG. 13.

When the user manipulates the sliding lens cover 18 to turn on the power switch 45 of the digital camera 15 (#1), the CPU 40 outputs a command to the zoom motor driving portion 26, rotating a zoom motor 26a in the CW direction (clockwise) in order to protrude the photographing lens barrel 10 which is retracted in the retracted position (#2). Then, when it is confirmed that the photographing lens barrel 10 has protruded to the photographing position as shown in FIG. 7, the driving of the zoom motor 26a is stopped (#3).

Next, when the release button 11 is turned on by the user (#4), photometry operation is conducted by a photometry portion 13a to obtain information on the object illuminance, and the distance to the object is computed by a ranging portion 13b (#5). Then, a judgment is made as to whether the obtained illuminance information indicates an illuminance higher than the predetermined illuminance or not; when it indicates a higher illuminance (i.e., when the answer in #6 is YES), the diaphragm blade 1 is put in the light axis (see FIG. 2) to vary the amount of light passing therethrough (#7). On the other hand, when the obtained illuminance information indicates an illuminance lower than the predetermined illuminance (i.e., when the answer in #6 is NO), the diaphragm blade 1 is not operated but left at the position retracted from the light axis (see FIG. 3).

Thereafter, a focus motor 28a is driven by the focus motor driving portion 28 to operate the focusing member 27, and the photographing lens barrel 10 is driven based on focus information obtained from the object distance to move the photographing lens to the focus position for the object (#8), where image picking-up is started (#9). Next, the shutter blade 3 is moved from the open position to the close position (#10) to intercept the amount of light to pass through, thereby completing the image picking-up (#11). Thereafter, the diaphragm blade 1 is retracted from the light axis (#12), and the focusing member 27 is moved to the initial position (#13) to complete the series of operations.

Figure 14:
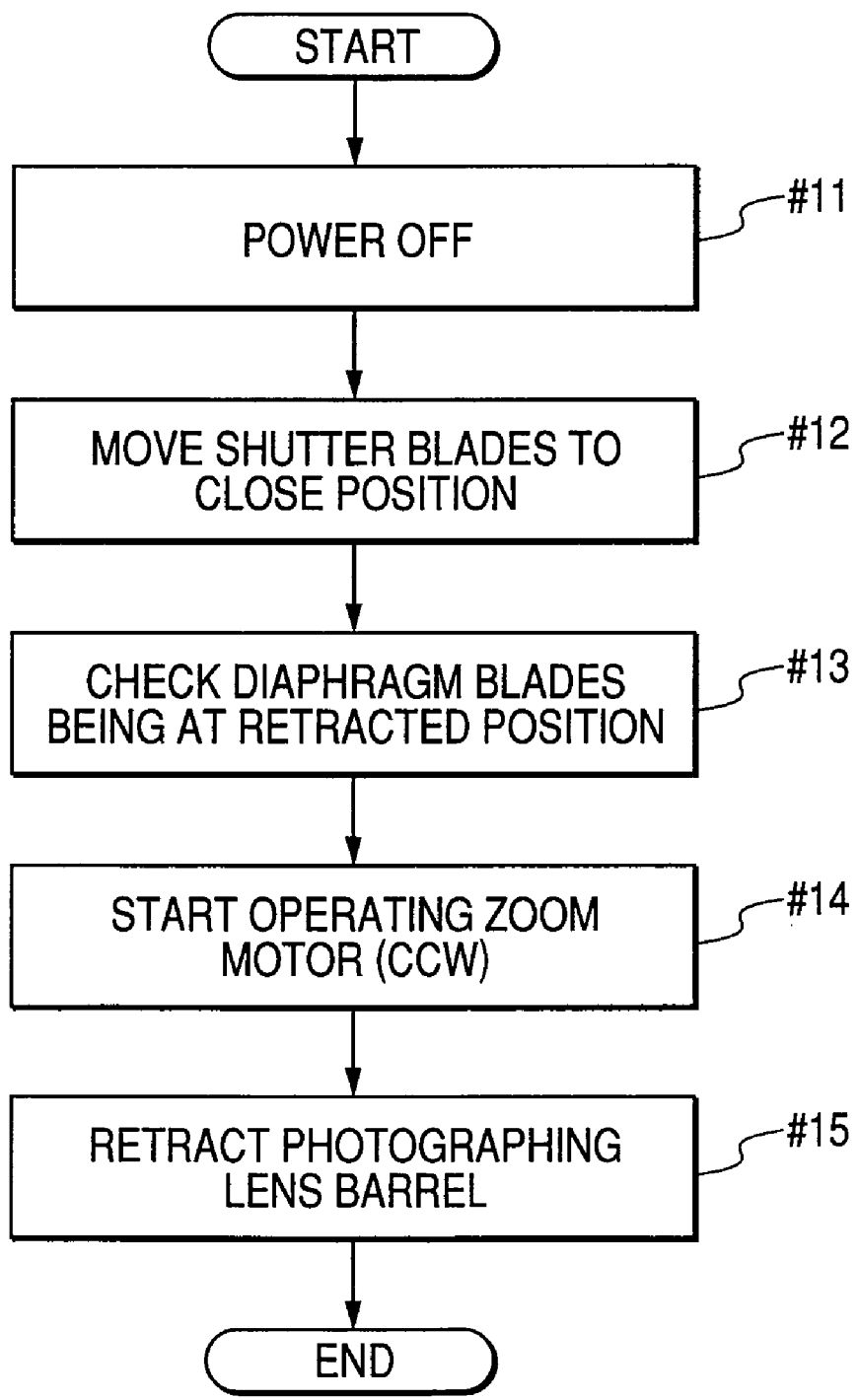
FIG. 14 is a flowchart illustrating the operation of a digital camera according to an embodiment of the present invention with the power off.

Next, the operation when the user turns off the power switch 45 of the digital camera 15 will be described with reference to the flowchart of FIG. 14.

When the user turns off the power switch 45 of the digital camera 15 (#11), the shutter blade 3 is first moved to the close position (#12). Then, the diaphragm blade 1 is started to be moved to the retracted position (see FIG. 3); when it is confirmed that the diaphragm blade 1 has been moved to a predetermined position (#13), the zoom motor 26a is rotated counterclockwise (in the CCW direction) (#14), and the photographing lens barrel 10 is retracted to a predetermined position (the retracted position as shown in FIG. 7) (#15), thereby completing the operation when the power switch 45 is turned off.

In this way, in the light amount adjusting apparatus of this embodiment, the shutter blade 3 and the diaphragm blade 1 are provided in the base plate 5, and the partition plate 2 is provided between both the blades. The cut portion 2a is provided at a position such that the cut portion 2a overlaps the diaphragm blade 1 of the partition plate 2, with the diaphragm blade 1 being retracted from the partition plate opening 2b. Accordingly, even in a high-humidity condition, it is possible to reduce the force with which the partition plate 2 and the diaphragm blade are held in close contact with each other. In other words, there is no need to increase the size of the actuator for driving the diaphragm blade 1 (that is, the driving portion 6 or the drive circuit 37) or to increase the power in order to boost its torque, nor is it necessary to add any special component. Thus, even when the digital camera 15 equipped with the light amount adjusting unit constructed as described above is placed in an unfavorable condition, and dew condensation or the like occurs, the diaphragm blade 1 can be operated smoothly.

When the camera is not in use, the diaphragm blade 1 is kept in the open state, with the cut portion 2b of the partition plate 2 overlapping the diaphragm blade 1. Thus, even in a high-humidity condition, the force with which the partition plate 2 and the diaphragm blade 1 are held in close contact with each other is reduced, so that the diaphragm blade 1 can be operated smoothly when the diaphragm blade 1 is to be driven.

Further, the cut portion 2b of the partition plate 2 may be provided at a position such that the cut portion 2b overlaps the shutter position when the shutter blade 3 is at the open position (When the shutter blade 3 is at the close position, the shutter blade 3 and the partition plate opening 2b overlap each other, so that dew compensation does not easily occur between the shutter blade 3 and the partition plate 2). Even in a high-humidity condition, the force with which the partition plate 1 and the shutter blade 3 are held in close contact with each other is reduced, making it possible to operate the shutter blade 3 smoothly.

(Modification)

While the above embodiment is applied to a digital camera, the present invention is also applicable to a video camera, an analog camera using silver-halide film or the like equipped with a similar light amount adjusting unit of the same construction, making it possible to smoothly operate the diaphragm blade even when there is dew condensation.

This application claims priority from Japanese Patent Application Nos. 2004-221091 filed Jul. 29, 2004 and 2005-186011 filed on Jun. 27, 2005 which are hereby incorporated by reference herein.

What is claimed is:

1. A light amount adjusting apparatus used in an image pickup apparatus, the light amount adjusting apparatus comprising:
 a base plate having a first opening;
 a blade member movable within a range including a position where the blade member overlaps the first opening in an optical axis direction, for restricting an amount of a light passing through the first opening by overlapping the first opening;
 a plate member having a second opening at a position overlapping the first opening in the optical axis direction wherein the plate member is disposed adjacent to the blade member and has a first cut portion at a position where the plate member overlaps the blade member in the optical axis direction in a state in which the blade member is at a predetermined position; and
 a cover member which is provided to sandwich the blade member in the optical axis direction with the plate member and in which a second cut portion is formed so that at least both whole portion of the second opening and a part of the first cut portion locate within the second cut portion;
 wherein the second opening is positioned at a position where the second opening overlaps the first opening regardless of a position of the blade member.

2. A light amount adjusting apparatus according to claim 1, wherein the predetermined position of the blade member is a position where the blade member does not restrict the amount of the light passing through the opening.

3. A light amount adjusting apparatus according to claim 1, wherein an overlapping amount of the blade member and the first cut portion in the state in which the blade member is at a position where the blade member does not restrict the amount of the light passing through the opening, is larger than that in the state in which the blade member is at a position where the blade member restricts the amount of the light passing through the opening.

4. A light amount adjusting apparatus according to claim 1, wherein an overlapping amount of the blade member and the first cut portion becomes maximum in the state in which the blade member is at the position where the blade member does not restrict the amount of the light passing through the opening.

5. A light amount adjusting apparatus according to claim 1, wherein an overlapping amount of the blade member and the first cut portion becomes maximum in a state in which no drive signal is supplied to the light amount adjusting apparatus.

6. A light amount adjusting apparatus according to claim 1, wherein the blade member and the plate member have opposing surfaces formed by flat surfaces, and wherein the plate member has the first cut portion in a part of the flat surface of the plate member.

7. An image pickup apparatus in which an amount of a light reaching an image pickup means is controlled by a light amount adjusting apparatus, the image pickup apparatus comprising:
 a base plate having a first opening;
 a blade member movable within a range including a position where the blade member overlaps the first opening in an optical axis direction, for restricting an amount of a light passing through the first opening by overlapping the first opening;
 a plate member having a second opening at a position overlapping the first opening in the optical axis direction wherein the plate member is disposed adjacent to the blade member and has a first cut portion at a position where the plate member overlaps the blade member in the optical axis direction in a state in which the blade member is at a predetermined position; and
 a cover member which is provided to sandwich the blade member in the optical axis direction with the plate member and in which a second cut portion is formed so that at least both whole portion of the second opening and a part of the first cut portion locate within the second cut portion;
 wherein the second opening is positioned at a position where the second opening overlaps the first opening regardless of a position of the blade member.

8. An image pickup apparatus according to claim 7, wherein the predetermined position of the blade member is a position where the blade member does not restrict the amount of the light passing through the opening.

9. An image pickup apparatus according to claim 7, wherein an overlapping amount of the blade member and the first cut portion in the state in which the blade member is at the position where the blade member does not restrict the amount of the light passing through the opening, is larger than that in the state in which the blade member is at the position where the blade member restricts the amount of the light passing through the opening.

10. An image pickup apparatus according to claim 7, wherein an overlapping amount of the blade member and the first cut portion becomes maximum in the state in which the blade member is at the position where the blade member does not restrict the amount of the light passing through the opening.

11. An image pickup apparatus according to claim 7, wherein an overlapping amount of the blade member and the first cut portion becomes maximum in a state in which a power source of the image pickup apparatus is off.

12. An image pickup apparatus according to claim 7, wherein the blade member and the plate member have opposing surfaces formed by flat surfaces, and wherein the plate member has the first cut portion in a part of the flat surface of the plate member.

* * * * *